US010594895B2

(12) United States Patent
Yoshizawa (10) Patent No.: US 10,594,895 B2
(45) Date of Patent: Mar. 17, 2020

(54) OUTPUT IMAGE GENERATING METHOD OF AN IMAGE READING DEVICE, AND AN IMAGE READING DEVICE (71) Applicant: SEIKO EPSON CORPORATION, Tokyo (JP)

(72) Inventor: Motoki Yoshizawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/383,699

(22) Filed: Apr. 15, 2019

(65) Prior Publication Data
US 2019/0320089 A1 Oct. 17, 2019

(30) Foreign Application Priority Data

Apr. 17, 2018 (JP) ................................. 2018-079189

(51) Int. Cl.
H04N 1/401 (2006.01)
H04N 1/024 (2006.01)
(52) U.S. Cl.
CPC ............. *H04N 1/401* (2013.01); *H04N 1/024* (2013.01)
(58) Field of Classification Search
CPC .............................. H04N 1/401; H04N 1/024
See application file for complete search history.

(56) References Cited

U.S. PATENT DOCUMENTS

2006/0023267 A1* 2/2006 Ikeno ................... H04N 1/1017
358/474
2013/0028535 A1* 1/2013 Yamauchi ............ H04N 1/4076
382/274

FOREIGN PATENT DOCUMENTS

EP 2202956 A2 6/2010
JP 2001-028666 A 1/2001

OTHER PUBLICATIONS

The Extended European Search Report for the corresponding European Patent Application No. 19169550.1 dated Sep. 9, 2019.

* cited by examiner

*Primary Examiner* — Quang N Vo
(74) *Attorney, Agent, or Firm* — Global IP Counselors, LLP (57) ABSTRACT A controller 70 of an image reading device 1 acquires first black reference data at a first time point with a light source 31 off, and stores the first black reference data in a reference data storage 41, and at a second time point after the first time point, acquires with the light source 31 off and stores second black reference data in the reference data storage 41. The controller 70 stores in a scanning data storage 42, without applying shading correction, scanning data read from a document between the first time point and second time point with the light source 31 on. A shading corrector 51 applies shading correction using the first black reference data and second black reference data to the scanning data stored in the scanning data storage 42.

7 Claims, 10 Drawing Sheets

OUTPUT IMAGE GENERATING METHOD OF AN IMAGE READING DEVICE, AND AN IMAGE READING DEVICE

BACKGROUND

1. Technical Field

The present invention relates to an image reading device and an output image generating method of an image reading device that applies shading correction to scanning data to generate an output image.

2. Related Art

JP-A-2001-028666 discloses an image reading device that stores a drift curve defining change in the offset voltage due to drift of the image reader, corrects the black reference data by estimating the offset voltage based on the drift curve when a document is read, and uses the corrected black reference data to correct shading in the scanning data captured from the document.

SUMMARY

A problem with the method described in JP-A-2001-028666 is that the calculation precision of the black reference data is not sufficient and could be improved.

An output image generating method of an image reading device according to the invention includes: a first acquisition step of storing, in a storage, first black reference data, which is black reference data acquired with a light source off at a first time point; a second acquisition step of storing, in a storage, second black reference data, which is black reference data acquired with the light source off at a second time point after the first time point; a first scanning step of storing, in a storage, without applying shading correction, scanning data captured from a document while the light source is on between the first time point and second time point; and a generating step of applying an image process, including shading correction using the first black reference data and second black reference data, to the scanning data after the second time point, and generating an output image.

An image reading device according to another aspect of the invention includes: a first acquirer configured to store, in a storage, first black reference data, which is black reference data acquired with a light source off at a first time point; a second acquirer configured to store, in a storage, second black reference data, which is black reference data acquired with the light source off at a second time point after the first time point; a first scanner configured to store, in a storage, without applying shading correction, scanning data captured from a document while the light source is on between the first time point and second time point; and a generator configured to apply an image process, including shading correction using the first black reference data and second black reference data, to the scanning data after the second time point, and generate an output image.

Other objects and attainments together with a fuller understanding of the invention will become apparent and appreciated by referring to the following description and claims taken in conjunction with the accompanying drawings.

DESCRIPTION OF EMBODIMENTS

Embodiment 1

An output image generating method of an image reading device, and an image reading device, according to a preferred embodiment of the invention are described below. This embodiment describes a sheet feed scanner configured to scan while conveying a document as an example of an image reading device according to the invention.

Figure 1:
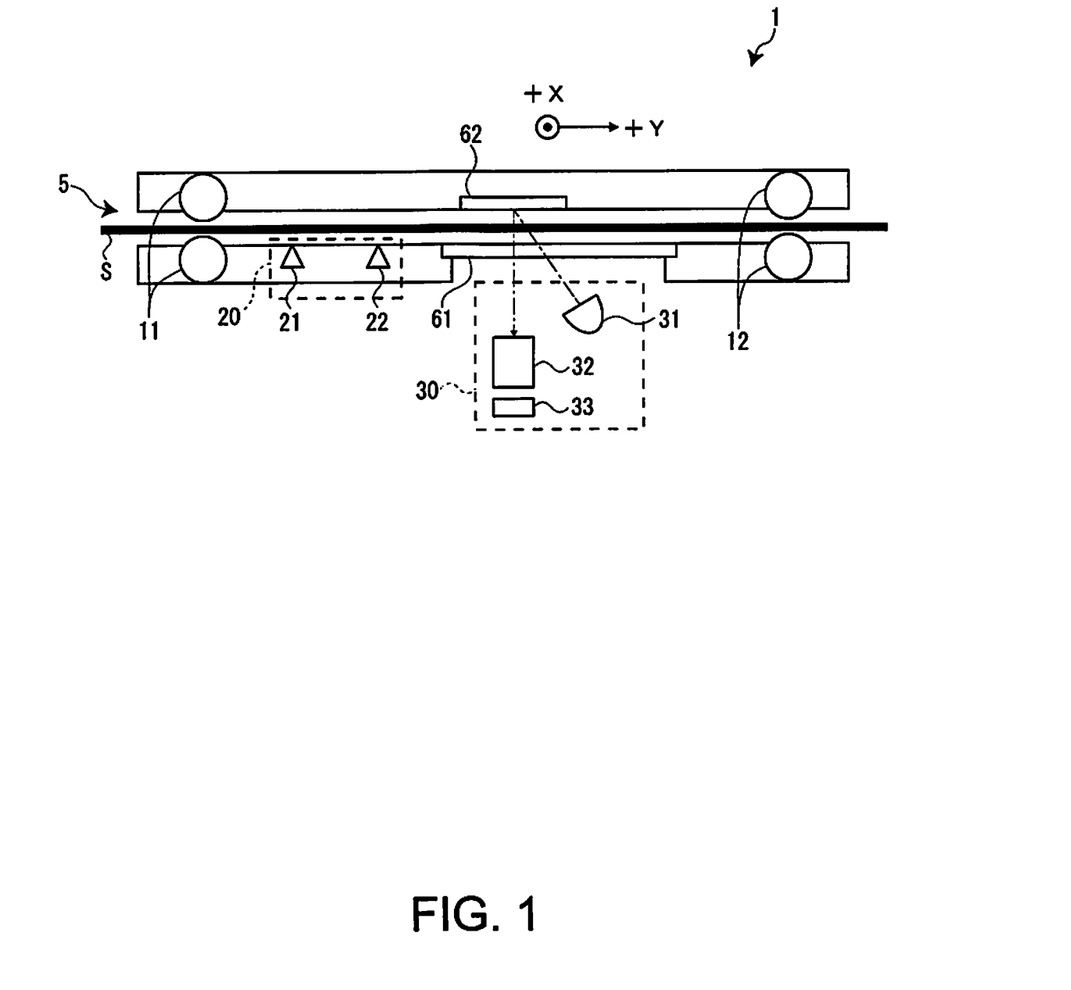
FIG. 1 illustrates the configuration of the conveyance path part of the image reading device.

FIG. 1 illustrates the configuration of the conveyance path part of an image reading device 1 according to the invention. The image reading device 1 has a conveyance path 5 through which a document S is conveyed. In this embodiment of the invention the document S is a long paper media such as roll paper. A pair of upstream conveyance rollers 11, a paper detector 20, a image scanner 30, and a pair of downstream conveyance rollers 12 are disposed to the conveyance path 5. An optically transparent platen glass 61, and a white reference panel 62 for acquiring white reference data, are disposed opposite each other at a position on the conveyance path 5 facing the image scanner 30.

The upstream conveyance rollers 11 are located upstream from the image scanner 30 in the conveyance direction of the document S, that is, on the −Y side of the image scanner 30 as seen in FIG. 1. The downstream conveyance rollers 12 are located downstream from the image scanner 30 in the conveyance direction of the document S, that is, on the +Y side of the image scanner 30. The upstream conveyance rollers 11 and downstream conveyance rollers 12 convey the document S through the conveyance path 5 in the +Y direction.

The paper detector 20 includes a document sensor 21 and a paper feed sensor 22. The document sensor 21 is on the −Y side of the paper feed sensor 22. The document sensor 21 is a sensor for detecting the entry of a document S to the conveyance path 5. The paper feed sensor 22 is a sensor for detecting conveyance of the document S to the indexing position. The detection position of the paper feed sensor 22 is therefore the indexing position.

The image scanner 30 has a light source 31, lens array 32, and image sensor 33. The light emitted from the light source 31 passes through the platen glass 61 and illuminates the white reference panel 62 or the document S conveyed over the platen glass 61. The light reflected from the white reference panel 62 or the document S is incident to the image sensor 33 through the lens array 32.

Figure 2:
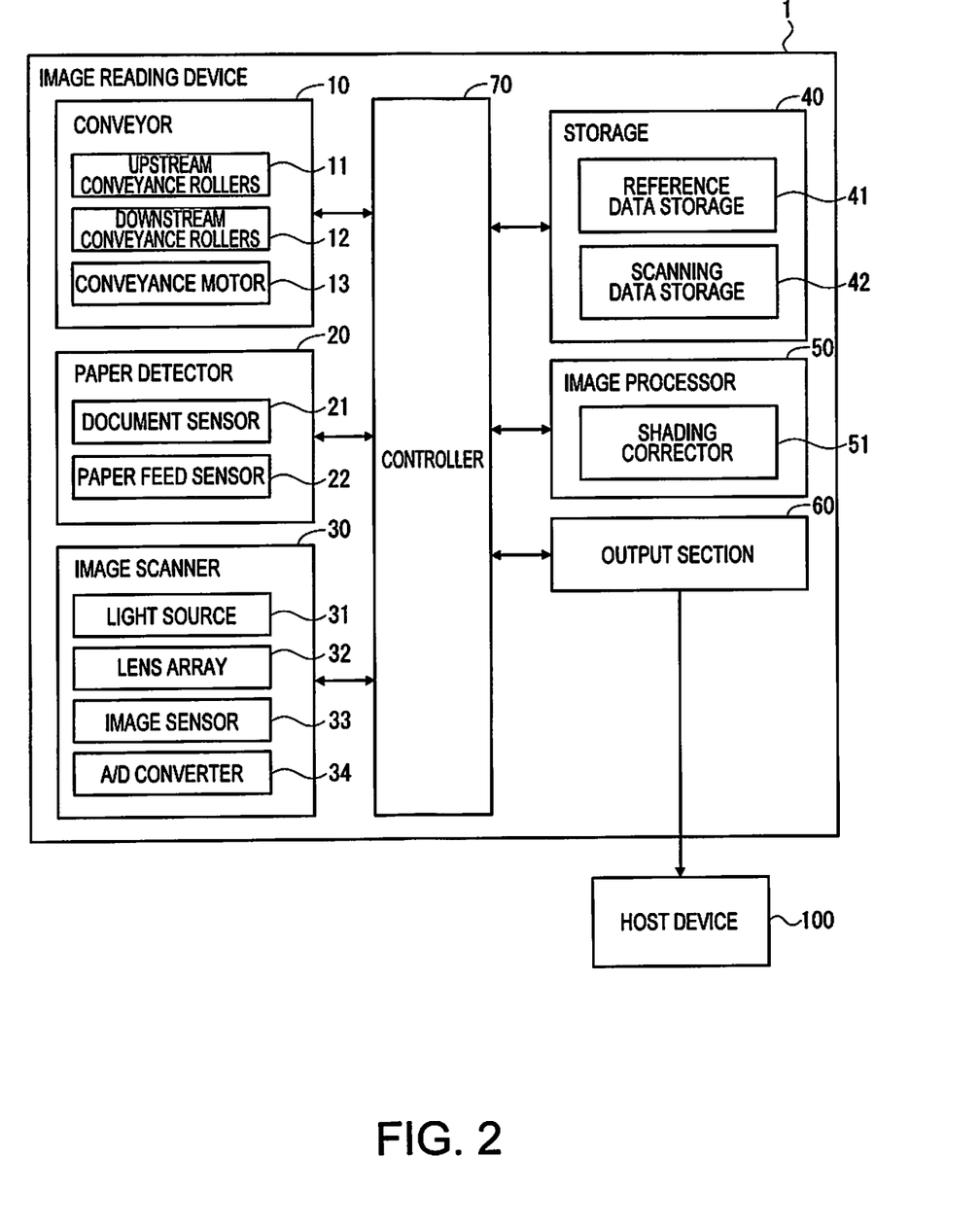
FIG. 2 is a block diagram of the control system of the image reading device.

FIG. 2 is a block diagram of the control system of the image reading device 1. The image reading device 1 includes a conveyor 10, paper detector 20, image scanner 30, storage 40, image processor 50, output section 60, and controller 70. The controller 70 is an example of the first acquirer, second acquirer, and first scanner according to the invention. They image processor 50 and controller 70 are an example of a data generator.

The conveyor 10 includes the upstream conveyance rollers 11, downstream conveyance rollers 12, and a conveyance motor 13. The upstream conveyance rollers 11 and downstream conveyance rollers 12 each include a drive roller and a driven roller. The conveyance motor 13 drives the drive rollers of the upstream conveyance rollers 11 and downstream conveyance rollers 12. Note that there may be two conveyance motors 13 to drive the upstream conveyance rollers 11 and downstream conveyance rollers 12 separately.

The paper detector 20 includes the document sensor 21 and paper feed sensor 22. The document sensor 21 and paper feed sensor 22 are optical sensors comprising an emitter and a photodetector, for example, illuminate the conveyance path 5 with light from the emitter, and detect the presence of the document S by the photodetector detecting the reflection of the emitted light. Based on the detection result from the paper detector 20, the controller 70 determines the position of the document S on the conveyance path 5. For example, when the detection result from the document sensor 21 changes from No Document to Document Detected, the controller 70 determines that a document S was introduced to the conveyance path 5. When the detection result from the paper feed sensor 22 changes from No Document to Document Detected, the controller 70 determines that a document S was conveyed to the indexing position.

The image scanner 30 includes a light source 31, lens array 32, image sensor 33, and A/D converter 34. The light source 31 in this embodiment includes a red LED, green LED, and blue LED, and sequentially emits the three colors of light.

The lens array 32 is a rod lens array in this example, and forms a continuous image by combining same-size erect images from multiple lenses aligned in a direction intersecting the conveyance direction of the document S, that is, aligned on the X-axis (see FIG. 1).

The image sensor 33 in this example is a CCD (Charge Coupled Device) sensor or a CMOS (Complementary Metal Oxide Semiconductor) sensor, and is configured with multiple sensor chips arrayed along the X-axis. Each sensor chip includes a photoelectric conversion element. The amount of light picked up by the photoelectric conversion element is stored as an electric charge, and the charge is output as an analog signal. The A/D converter 34 converts the analog signal output from the image sensor 33 to a digital signal.

The storage 40 includes a reference data storage 41 and a scanning data storage 42. The storage 40 in this example is DRAM (Dynamic Random Access Memory). Note that the reference data storage 41 and scanning data storage 42 in this example are examples of storage in the invention.

The reference data storage 41 stores reference data used as reference values for shading correction. Black reference data and white reference data are stored as the reference data in this example. When storing reference data, the reference data storage 41 is configured to overwrite the previously stored reference data with the new reference data.

The controller 70 acquires the white reference data by driving the light source 31 to illuminate the white reference panel 62, and detecting the reflection with the image sensor 33. The controller 70 acquires the black reference data by acquiring the detection result from the image sensor 33 when the light source 31 is off. The black reference data and white reference data preferably indicate the read results of all sensor chips arrayed on the X-axis, but if speed is more important than precision, the photoelectric conversion elements may be sampled to capture the read results from a subset of the photoelectric conversion elements.

The scanning data storage 42 stores the scanning data read from the document S. When storing scanning data, the scanning data storage 42 is configured to overwrite the scanning data that was previously stored with the new scanning data. The controller 70 stores the scanning data captured from the document S when the light source 31 is on in the scanning data storage 42 without correcting shading.

The image processor 50 applies various image processes to the scanning data to generate an output image, and includes a shading corrector 51. The image processor 50 in this example is a dedicated ASIC (Application Specific Integrated Circuit) for image processing. The image processor 50 may obviously be configured with a CPU, or by using both a CPU and ASIC.

The shading corrector 51 applies shading correction to compensate for variation in the sensitivity of the sensor chips of the image sensor 33.

Because sensor chip output is temperature dependent, the output level of individual sensor chips varies according to change in the ambient temperature of the image reading device 1, and heat produced after the image reading device 1 turns on. Because change in the dark output, that is, change in the black level, often expands gradations on the black side during gradation correction, changes in the black level can easily affect the output image.

The shading corrector 51 in this embodiment uses the black reference data acquired before acquiring scanning data, and black reference data acquired after capturing the scanning data, to apply shading correction to the scanning data resulting from scanning a document S. This process is described in further detail below. Note that the image processor 50 may also apply image processes other than shading correction, such as gamma correction, line correction, and skew correction, after shading correction by the shading corrector 51.

The output section 60 outputs the output image after image processing by the image processor 50 to the host device 100. The output image is output by the image units to which shading correction is applied by the shading corrector 51. The host device 100 in this example is a PC (Personal Computer).

Note that the output section 60 may output and display the output image on a display device. The output section 60 may also output the output image to a printing means for printing, or output the output image to a communication means or storage means. The output image may also be output in a specific image file format as required.

The controller 70 is connected to and controls operation of the devices described above. The controller 70 in this example comprises a CPU (Central Processing Unit), ROM (Read Only Memory), and RAM (Random Access Memory).

Before starting document S conveyance and scanning, the controller 70 acquires and stores the black reference data and white reference data in the reference data storage 41. The black reference data and white reference data acquired at this time are referred to below as first black reference data and first white reference data, respectively.

The controller 70 then starts conveying and scanning the document S, and stores the scanning data for each pixel row read from the document S to the scanning data storage 42 as the document S is read. After starting conveying and scanning the document S, the controller 70 pauses document S conveyance and scanning when a specific time has past, and acquires and stores black reference data in the reference data storage 41. The black reference data acquired at this time is referred to below as second black reference data. Note that this embodiment does not acquire white reference data other than the first white reference data.

Based on the first black reference data and second black reference data stored in the reference data storage 41, the shading corrector 51 of the image processor 50 calculates black reference data between the first black reference data and second black reference data. More specifically, the shading corrector 51 calculates black reference data during the scanning data acquisition period by a linearly interpolating between the first black reference data and second black reference data. The shading corrector 51 then corrects shading in the acquired scanning data using the calculated black reference data.

Figure 3:
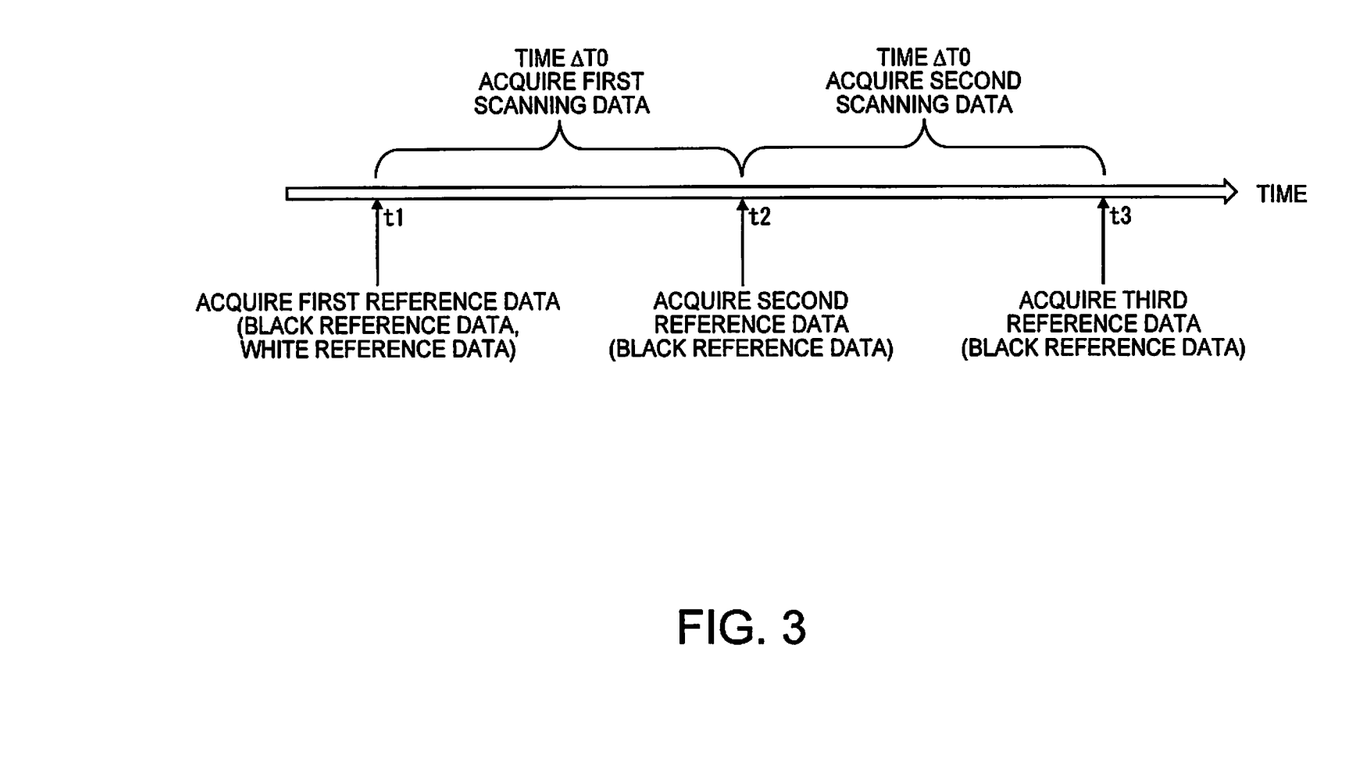
FIG. 3 illustrates the relationship between the timing of reference data acquisition and the scanning data acquisition period in a first embodiment of the invention.

FIG. 3 illustrates the relationship between the timing of reference data acquisition and the scanning data acquisition period in a first embodiment of the invention.

At first acquisition time ti. the controller 70 acquires, as first reference data, first black reference data and first white reference data, and immediately starts conveying and scanning a document S. The controller 70 then pauses conveying and scanning the document S at second acquisition time t2 when time ΔT0 (ΔT0 ≒ t2−t1) has past after starting conveying and scanning the document S. The controller 70 acquires scanning data during time ΔT0. At second acquisition time t2 while conveying and scanning the document S is paused, the controller 70 acquires second black reference data as second reference data.

After acquiring the second reference data, the controller 70 resumes conveying and scanning the document S, and pauses conveying and scanning the document S at third acquisition time t3 after acquiring scanning data for time ΔT0. The scanning data acquired during this time ΔT0 is referred below to as second scanning data. At third acquisition time t3 while conveying and scanning the document S is paused, the controller 70 acquires third black reference data as third reference data.

The controller 70 then continues these steps of acquiring reference data and scanning data until scanning the document S is completed.

When calculating the black reference data in the acquisition period of the first scanning data read between first acquisition time t1 and second acquisition time t2, the first acquisition time ti and second acquisition time t2 are equivalent to the first time point and second time point in the accompanying claims. The second acquisition time t2 and third acquisition time t3 are equivalent to the first time point and second time point in the accompanying claims when calculating the black reference data in the acquisition period of the second scanning data read between second acquisition time t2 and third acquisition time t3.

In other words, the first time point of the invention is not limited to the first acquisition time ti in this embodiment, and may be any acquisition time (N−1) where N is an integer value of N≥2. The second time point is also not limited to second acquisition time t2 in this embodiment, and may be any acquisition time N. More specifically, the first time point and second time point of the invention are a time before acquisition of scanning data for which black reference data is calculated, and a time after scanning data is acquired.

Figure 4:
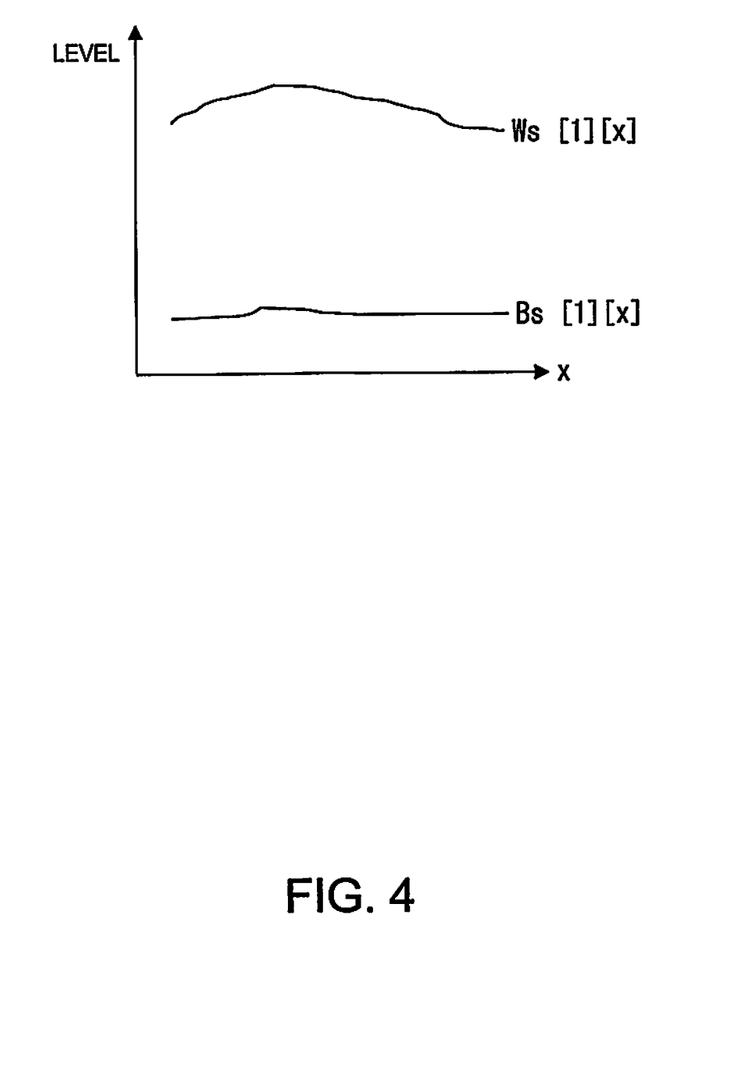
FIG. 4 is a graph showing an example of black reference data acquisition values and first white reference data acquisition values.
Figure 5:
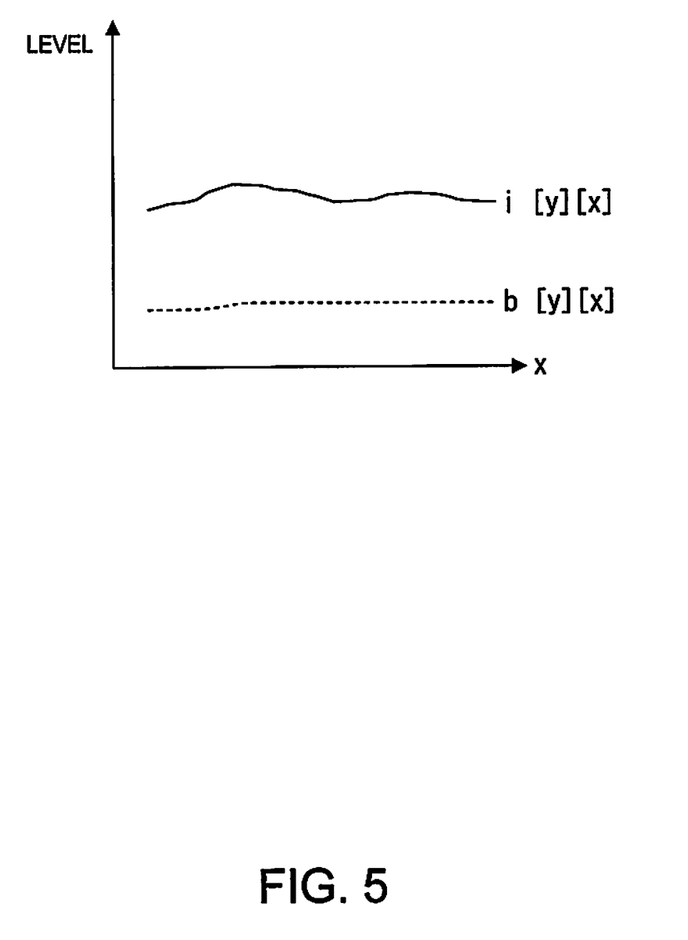
FIG. 5 is a graph showing an example of scanning data acquisition values and calculated black reference data values.
Figure 6:
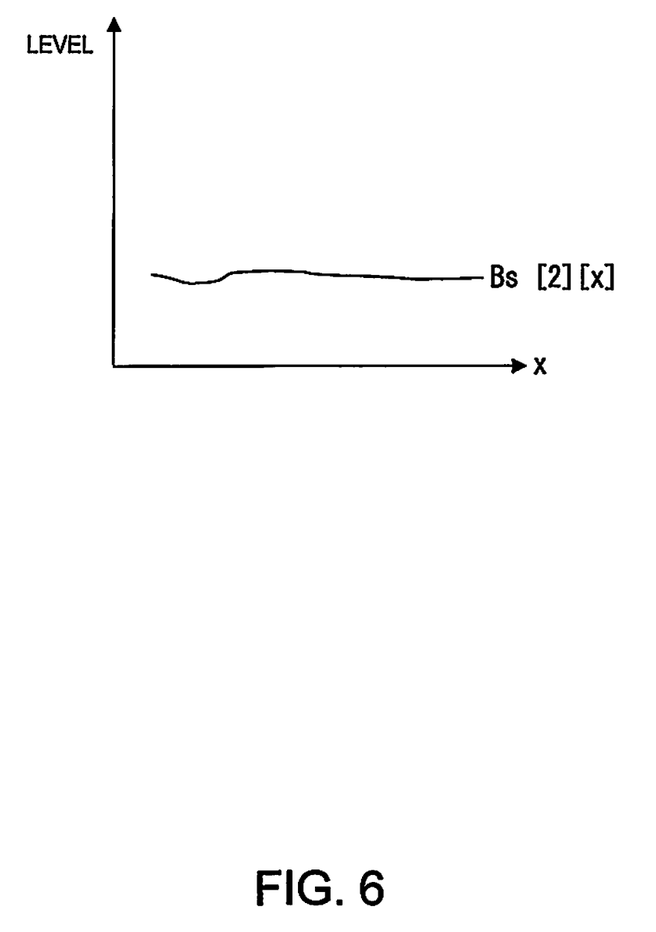
FIG. 6 is a graph showing an example of second black reference data acquisition values.

FIG. 4 to FIG. 6 are graphs showing examples of acquired and calculated reference data values, and scanning data acquisition values. In these graphs the signal level is shown on the Y-axis, and X coordinates are on the X-axis. In FIG. 4, Bs [1] [x] indicates the acquisition values for the first black reference data, and Ws [1] [x] indicates the acquisition values for the first white reference data, where [x] indicates a pixel number of the multiple sensor chips arrayed on the X-axis direction.

FIG. 5 shows scanning data acquisition values i [y] [x], and calculated black reference data values b [y] [x], where [y] represents the pixel line scanned by conveyance of the document S in the +Y direction.

FIG. 6 shows the second black reference data acquisition values Bs [2] [x].

As will be understood from FIG. 4 and FIG. 6, the black reference data acquisition values vary. To cancel the effects of this variation in black reference data on the output image, the shading corrector 51 uses, as the black reference data used in shading correction, the black reference data calculated based on the black reference data values acquired before and after the scanning data acquisition period.

The shading correction equation is described next. The scanning data output value Out [y] [x] is calculated using equation (1) below. Note that Out [y] [x] is a value normalized by 1.

$$\mathrm{Out}[y][x] = \frac{i[y][x] - b[y][x]}{w[y][x] - b[y][x]} \quad (1)$$

As shown in equation (1), the output value of the scanning data can be calculated by dividing the difference of the acquired scanning data value minus the black reference data by the difference of the white reference data minus the black reference data.

As described above, because the output value of the scanning data is calculated assuming the level of the difference of the white reference data minus the black reference data does not change, the difference of the white reference data minus the black reference data w[y] [x]−[y] [x] is constant. Therefore, the output value of the scanning data is calculated as shown in equation (2).

$$\mathrm{Out}[y][x] = \frac{i[y][x] - b[y][x]}{Ws[1][x] - Bs[1][x]} \quad (2)$$

The black reference data b [y] [x] in the acquisition period of the first scanning data is calculated by a linear interpolation using the acquired value Bs [1] [x] of the first black reference data, and the acquired value Bs [2] [x] of the second black reference data. In other words, The black reference data in the first scanning data acquisition period is calculated from equation (3) below, where n indicates the number of pixel lines in the scanning data acquired during time ΔT0.

$$b[y][x] = (Bs[2][x] - Bs[1][x]) \times \frac{y}{n} + Bs[1][x] \quad (3)$$

Figure 7:
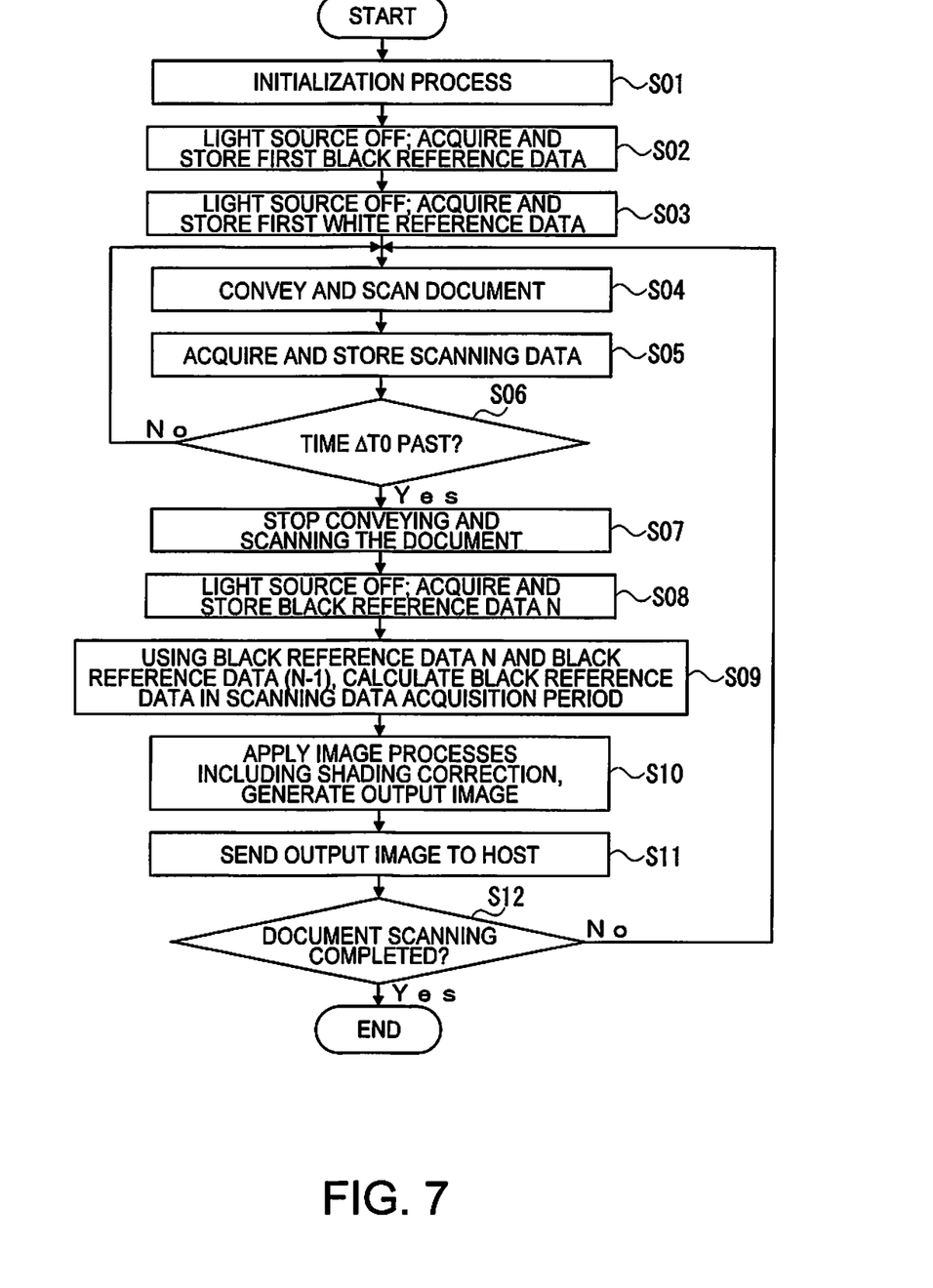
FIG. 7 is a flow chart of the scanning process according to the first embodiment of the invention.

FIG. 7 is a flow chart showing the flow of the scanning process of image reading device 1. The image reading device 1 starts the scanning process in response to a user command. The user command may be issued through an operating panel not shown of the image reading device 1, or using the host device 100, for example. When the scanning process starts, the image reading device 1 executes an initialization process (S01). The initialization process includes determining based on the detection result from the paper feed sensor 22 whether or not the document S was conveyed to the indexing position.

If the image reading device 1 determines the document S was not conveyed to the indexing position, the image reading device 1 determines based on the detection result from the document sensor 21 whether or not a document S was introduced to the conveyance path 5.

The image reading device 1 reports an error if it determines a document S was not introduced to the conveyance path 5, and conveys the document S to the indexing position if it determines a document S was introduced to the conveyance path 5. As part of the initialization process, the image reading device 1 also sets the time when the light source 31 turns on.

When the initialization process ends, the image reading device 1 turns the light source 31 off, acquires the first black reference data, and stores the acquired first black reference data in the reference data storage 41 (S02). The image reading device 1 then immediately turns the light source 31 on, acquires the first white reference data, and stores the acquired first white reference data in the reference data storage 41 (S03). These steps S02 and S03 are examples of the first acquisition step of the invention.

The image reading device 1 then starts conveying and scanning the document S (S04). The image reading device 1 acquires scanning data as it reads the document S, and stores the acquired scanning data in the scanning data storage 42 (S05). This step S05 is an example of a first scanning step of the invention. The image reading device 1 then determines if time $\Delta T0$ has past since conveying and scanning the document S started (S06), and if time $\Delta T0$ has not past (S06: No), returns to S04.

If the image reading device 1 determines time $\Delta T0$ has past since conveying and scanning the document S started (S06: Yes), it pauses conveying and scanning the document S (S07), turns the light source 31 off and acquires black reference data N, and stores the acquired black reference data N in the reference data storage 41 (S08). Note that N is an integer value of N≥2. Step S08 is an example of a second acquisition step of the invention.

Using the black reference data N and black reference data (N−1) stored in the reference data storage 41, the image reading device 1 then calculates, based on equation (3) above, the black reference data in the acquisition period of scanning data (N−1) (S09). This step S09 is an example of a calculation step of the invention. Next, using the calculated black reference data, the image reading device 1 applies shading correction based on equation (2) above, applies image processes other than shading correction as appropriate, and generates an output image (S10). This step S10 is an example of a generation step of the invention.

The image reading device 1 outputs the generated output image to the host device 100 (S11), and determines if document S scanning is completed (S12). The image reading device 1 determines document S scanning is completed when the detection result from the document sensor 21 changes from Document Detected to No Document. The image reading device 1 ends the scanning process when it determines that document S scanning has ended (S12: Yes), and returns to S04 if it determines document S scanning has not ended (S12: No), S04.

As described above, the image reading device 1 according to this embodiment calculates black reference data in the acquisition period of first scanning data using the black reference data acquired at a first acquisition time t1 and at a second acquisition time t2, and applies shading correction using the calculated black reference data to the first scanning data acquired during time $\Delta T0$ between the first acquisition time t1 and second acquisition time t2. By thus using calculated black reference data, change in the signal level of the black reference data between first acquisition time t1 and second acquisition time t2 can be absorbed, and its effect on the output image can be reduced.

More particularly, when the document S is long, the effect on the output image increases as the scanning time increases. However, because the image reading device 1 according to the invention is configured to regularly acquire black reference data, and calculates black reference data for the time when the document S was read based on the black reference data acquired directly before and directly after the time the document S was read, the effect on the output image can be minimized even as the scanning (reading) time increases.

Furthermore, because the image reading device 1 pauses conveying the document S when acquiring reference data, there is no loss of image data while acquiring reference data while the document S is being conveyed.

Embodiment 2

A second embodiment of the invention is described next. The first embodiment describes acquiring only black reference data as reference data N, but this embodiment acquires both black reference data and white reference data. The document S in the first embodiment is a long media such as roll paper, but in this embodiment is a cut-sheet media. In other words, the image reading device 1 according to this embodiment delivers and conveys sheet media one sheet at a time from a stack of media. The image reading device 1 sets a delivery interval so that there is a specific gap between one sheet and the next sheet.

In addition, the image reading device 1 pauses document S conveyance by the conveyor 10 to acquire the black reference data, but this embodiment does not pause conveyance and acquires the reference data when the gap between one sheet and the next is at the scanning position of the image scanner 30.

This embodiment is described below focusing on the differences with the first embodiment. Note that like parts in this embodiment and the first embodiment are identified by the same reference numerals, and further description thereof is omitted. In addition, variations applicable to the first embodiment as described below are also applicable to this embodiment.

The equation used for shading correction in this embodiment is described first.

The output value Out [y] [x] of the first scanning data is calculated using equation (1) above. However, because this embodiment considers change in the level of the white reference data in addition to change in the level of the black reference data, w [y] [x] is also calculated as the calculated value of the white reference data using equation (4) below. Note that Ws [2] [x] indicates the acquired value of the second white reference data, that is, the value of the white reference data acquired when the gap between a first sheet and a second sheet of the sheet media is at the scanning position of the image scanner 30.

$$w[y][x] = (Ws[2][x] - Ws[1][x]) \times \frac{y}{n} + Ws[1][x] \qquad (4)$$

Note that the calculated value of the black reference data, b [y] [x], is calculated using equation (3) above.

Figure 8:
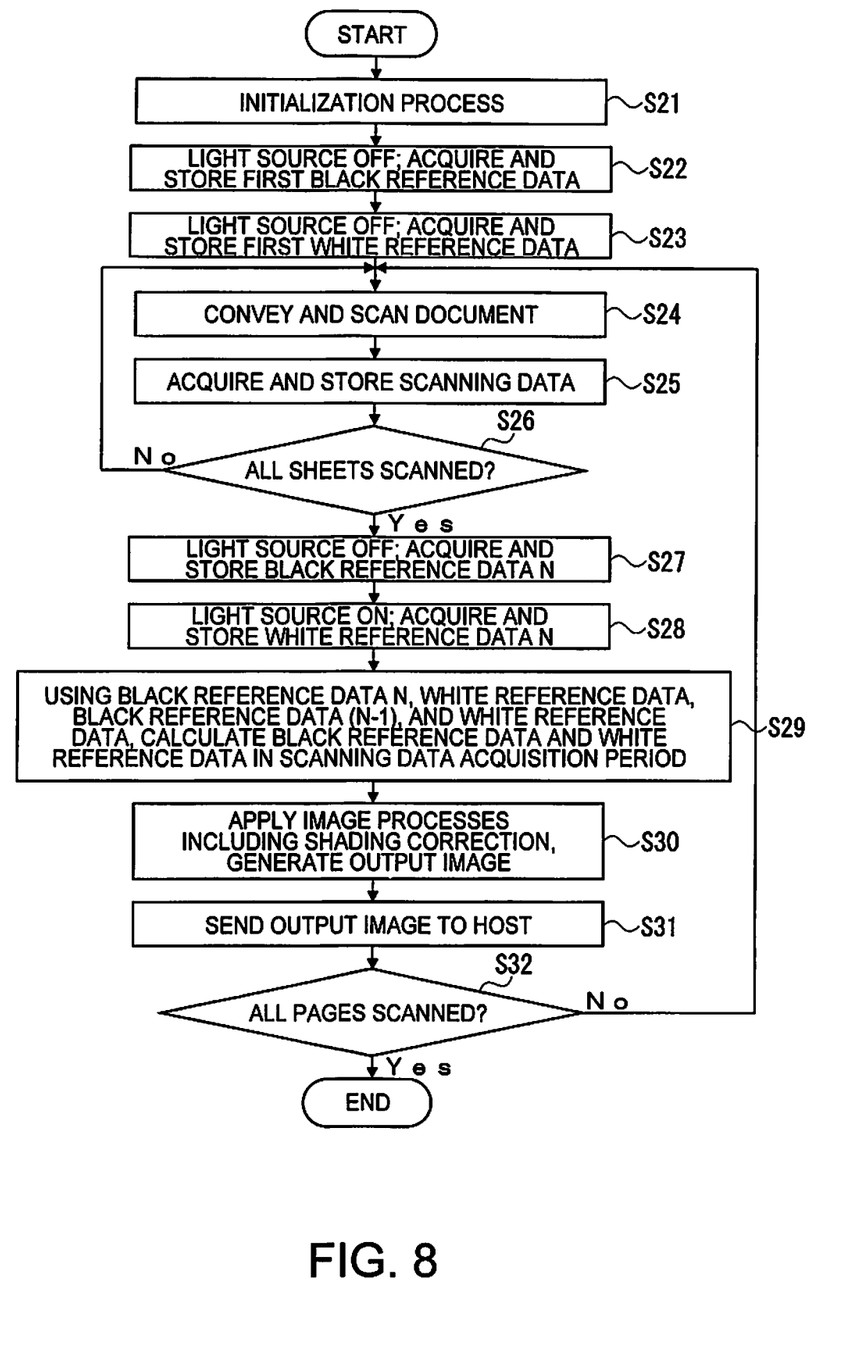
FIG. 8 is a flow chart of the scanning process according to the second embodiment of the invention.

FIG. 8 is a flow chart showing the flow of the scanning process according to the second embodiment of the invention. The image reading device 1 starts the scanning process in response to a user command, and executes the initialization process (S21).

When the initialization process ends, the image reading device 1 turns the light source 31 off, acquires the first black reference data, and stores the acquired first black reference data in the reference data storage 41 (S22). The image reading device 1 then immediately turns the light source 31 on, acquires the first white reference data, and stores the acquired first white reference data in the reference data storage 41 (S23). In other words, the image reading device 1 acquires the first black reference data and first white reference data substantially simultaneously. These steps S22 and S23 are examples of the first acquisition step of the invention.

The image reading device 1 then starts conveying and scanning the document S (S24). The image reading device 1 acquires scanning data as it reads the document S, and stores the acquired scanning data in the scanning data storage 42 (S25). This step S25 is an example of a first scanning step of the invention.

The image reading device 1 then determines if reading one sheet of the document S, which is cut-sheet media, ended (S26), and if reading one sheet is not completed (S26: No), returns to S24. The image reading device 1 determines scanning one sheet has ended based on the detection result of the paper feed sensor 22 changing from Document Detected to No Document. More specifically, by dividing the length stored as the distance from the location of the paper feed sensor 22 to the scanning position by the conveyance speed of the document 5, the image reading device 1 calculates the time required for the document S to advance this distance, and determines scanning one sheet is completed when this time has past since the detection result of the paper feed sensor 22 changed from Document Detected to No Document.

If the image reading device 1 determines that scanning one sheet of the document S has ended (S26: Yes), the image reading device 1 turns the light source 31 off and acquires black reference data N, and stores the acquired black reference data N in the reference data storage 41 (S27).

The image reading device 1 then immediately turns the light source 31 on, acquires white reference data N, and stores the acquired white reference data N in the reference data storage 41 (S28). In other words, the image reading device 1 acquires the black reference data N and white reference data N substantially simultaneously. Note that N is an integer value of N≥2. Steps S27 and S28 are examples of a second acquisition step of the invention.

Using the black reference data N, white reference data N, black reference data (N−1), and white reference data (N−1) stored in the reference data storage 41, the image reading device 1 then calculates, based on equations (3) and (4) above, the black reference data and white reference data in the acquisition period of the scanning data (S29). This step S29 is an example of a calculation step of the invention.

Next, using the calculated black reference data and white reference data, the image reading device 1 applies shading correction based on equation (1) above, applies image processes other than shading correction as appropriate, and generates an output image (S30). This step S30 is an example of a generation step of the invention.

The image reading device 1 outputs the generated output image to the host device 100 (S31), and determines if scanning all sheets of the document S is completed (S32).

The image reading device 1 determines all sheets of the document S have been scanned when a specific continuous time has past since the detection result from the document sensor 21 changed from Document Detected to No Document, when the set number of sheets in the document S have been scanned, or when no document S is delivered to the conveyance path. When the image reading device 1 determines scanning all sheets of the document S is completed (S32: Yes), the image reading device 1 ends the scanning process, but returns to S24 if it determines scanning all sheets of the document S has not ended (S32: No).

As described above, because the image reading device 1 according to this embodiment applies shading correction using both black reference data and white reference data, change in the difference of the white reference data minus the black reference data can be absorbed by shading correction.

Note that change in the signal level of the white reference data may be caused by change in the output level of the sensor chips of the image sensor 33, or by change in the amount of light emitted per unit of time by the light source 31. Therefore, if white reference data can be acquired while scanning a document S as in this embodiment, by regularly reading the white reference data, and calculating white reference data for the acquisition period of the scanning data based on the white reference data acquired directly before and directly after acquiring the scanning data, the effect of change in the output level of the image sensor 33, and change in the amount of light emitted per unit of time by the light source 31, on the output image can be minimized.

Two preferred embodiments of the invention are described above, but the invention is not limited to these embodiments and can be varied in many ways as described below. The equations can obviously be replaced by equivalent equations. Variations such as described below can also be combined in many ways.

Variation 1

The controller 70 in the first embodiment described above acquires reference data at a regular time AT0 interval, but is not limited to a constant time interval. For example, the interval between first acquisition time ti when the first reference data is acquired and second acquisition time t2 when the second reference data is acquired may be shorter than the interval between second acquisition time t2 when the second reference data is acquired and third acquisition time t3 when third reference data is acquired.

Figure 9:
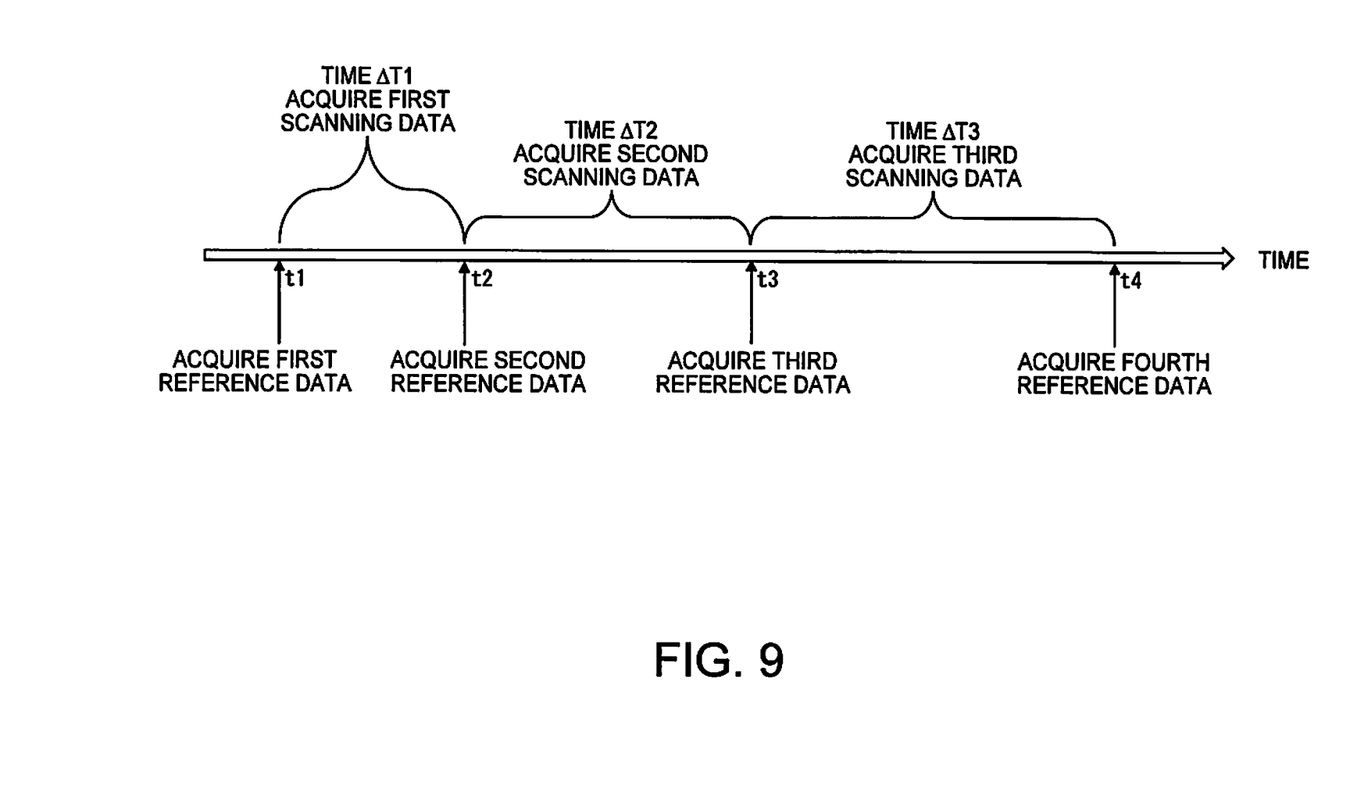
FIG. 9 shows the timing of reference data acquisition and the scanning data acquisition period in a first variation of the invention.

FIG. 9 illustrates the relationship between the timing of reference data acquisition and the scanning data acquisition period in this variation. The controller 70 acquires the first reference data at first acquisition time t1, and then immediately starts conveying and scanning the document S.

The controller 70 then pauses conveying and scanning the document S at second acquisition time t2 when time ΔT1 has past after starting conveying and scanning the document S, and acquires second reference data. The controller 70 acquires first scanning data during time ΔT1.

At third acquisition time t3 when a time ΔT2 that is longer than time ΔT1 has past since second acquisition time t2, the controller 70 pauses conveying and scanning the document S and acquires third reference data. This step is an example of a third acquisition step in the invention. Note that the third time point in the invention is not limited to this third acquisition time t3, and may be any acquisition time (N+1). The controller 70 acquires second scanning data during this time ΔT2. This step is an example of a second scanning step in the invention.

The controller 70 then pauses conveying and scanning the document S at fourth acquisition time t4 when time ΔT3, which is longer than time ΔT2, has past since third acquisition time t3, and acquires fourth reference data. The controller 70 acquires third scanning data during time ΔT3.

The interval for acquiring reference data thus gradually becomes longer in this example. This is because the change in sensor chip temperature becomes gradually smaller after document S scanning starts, and the change in the signal level of the black reference data therefore also gradually decreases. In other words, by gradually increasing the length of the reference data acquisition interval, the increase in takt time caused by reference data acquisition decreases, and the effect of change in the signal level of the black reference data on the output image can be effectively suppressed.

In another example, reference data may also be acquired at an irregular interval in the second embodiment. For example, the interval for reference data acquisition may be gradually increased by acquiring second reference data after reading the first page is done, acquiring third reference data after scanning the third page is done, acquiring fourth reference data after scanning the sixth page is done, and so forth. Note that when the reference data acquisition interval is gradually increased, the upper limit of the reference data acquisition interval may be determined according to the storage capacity of the scanning data storage 42.

In addition, in each of these examples, if change in the reference data exceeding a specific difference disappears as the reference data acquisition interval gradually increases because the temperature of the sensor chip becomes constant, the reference data may be considered constant and shading correction applied without continuing to acquire reference data.

Variation 2

Figure 10:
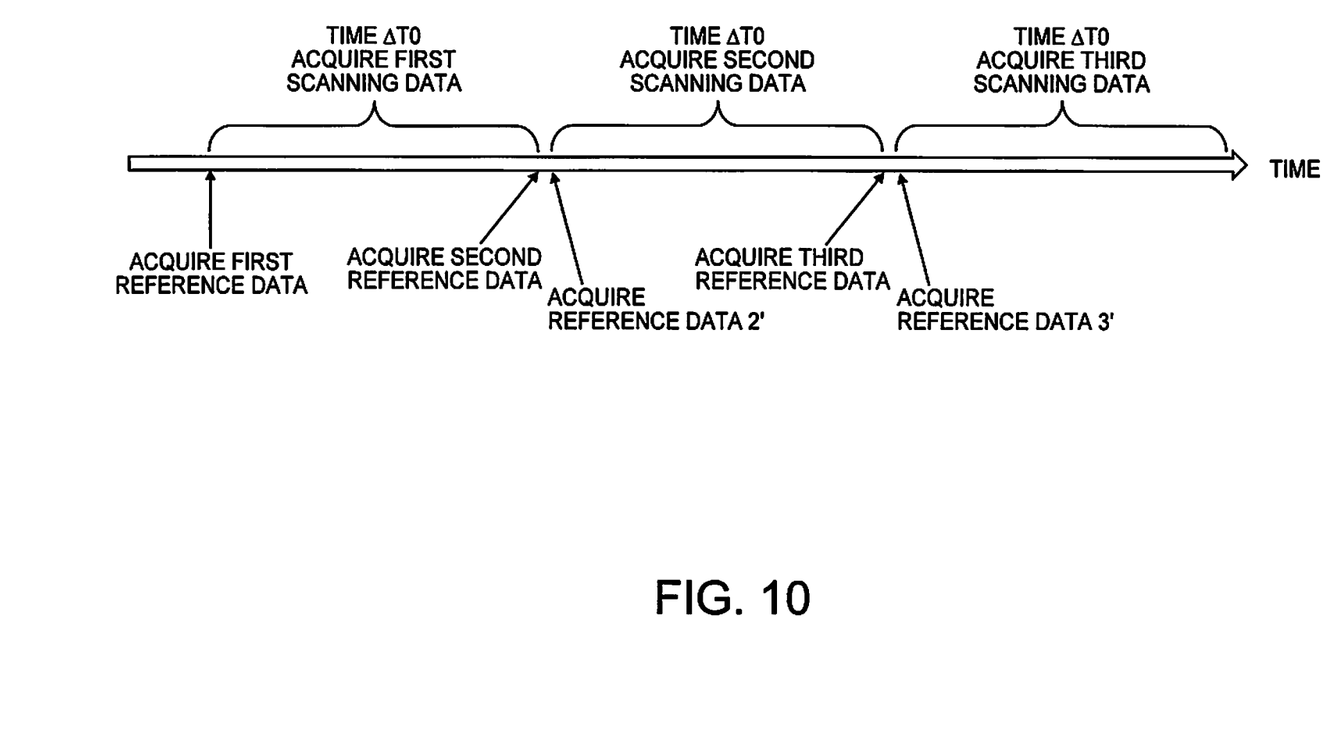
FIG. 10 shows the timing of reference data acquisition and the scanning data acquisition period in a second variation of the invention.

The controller 70 in the first embodiment described above acquires reference data before acquiring the scanning data, but reference data may be acquired before and after acquiring scanning data. In this example the time conveying and scanning the document S is stopped is presumed to be longer than the time required to acquire reference data. FIG. 10 illustrates the timing of reference data acquisition and the scanning data acquisition period in this example.

The controller 70 uses the first reference data and second reference data acquired time ΔT0 after the first reference data was acquired to calculate the black reference data in the acquisition period of the first scanning data acquired during this time ΔT0. The controller 70 also acquires reference data 2' immediately before acquiring second reference data while conveying and scanning the document S is stopped.

The controller 70 then uses reference data 2' and third reference data acquired time ΔT0 after reference data 2' was acquired to calculate the black reference data in the acquisition period of the second scanning data acquired during this time ΔT0.

Because this example acquires reference data immediately before acquiring scanning data, change in the reference data during the time conveying and scanning the document S is stopped can be ignored, and as a result the black reference data for the scanning data acquisition period can be calculated more accurately. The method of this example is particularly effective when the time conveying and scanning the document S is stopped is long. Note that the light source 31 may be turned off from second scanning data acquisition to reference data 2' acquisition, or may be temporarily turned off when acquiring reference data.

In another variation, this method may also be applied to the second embodiment described above. In this case, both second reference data and reference data 2' are acquired when a gap between one sheet and another sheet is at the reading position of the image scanner 30.

Variation 3

In the first embodiment described above the image scanner 30 reads the document S while the document S is being conveyed, but is not limited to scanning while the document S is being conveyed. For example, using a scanner capable of reading a fixed length of a document S with a two-dimensional sensor, when the document S is a long, continuous sheet, the document S can be scanned by conveying the document S a specific length, stopping conveyance, scanning the specific length portion of the document S while conveyance is stopped, and then repeating conveying the document S the specific length again, stopping, and scanning to the end of the document S. When the document S is a cut-sheet media, the document S can be repeatedly conveyed, stopped, and scanned in page increments readable by the two-dimensional sensor.

In another variation, the image reading device 1 of the invention can also be applied to a flatbed scanner that moves the image sensor 33 to read a document S placed on the document platen. In this application, the image sensor 33 is paused while scanning the document S to acquire the reference data.

Variation 4

In the embodiments described above, the shading corrector 51 calculates the black reference data in a particular scanning data acquisition period using the reference data last acquired before scanning data acquisition, and the reference data first acquired after scanning data acquisition, but is not so limited. For example, the black reference data for the second scanning data may be calculated using the first reference data and third reference data, and the black reference data for the third scanning data may be calculated using the first reference data and fourth reference data.

Variation 5

The shading corrector 51 in the embodiments described above calculates the black reference data by a linear interpolation, but may be configured to calculate the black reference data using an algorithm other than linear interpolation. For example, the black reference data may be calculated by a polynomial interpolation using three or more reference data; or change data defining variation in the black reference data may be stored in the image reading device 1, and the black reference data for the scanning data acquisition period calculated based on the previously stored change data and the reference data acquired before and after scanning data acquisition.

Further alternatively, directly corrected scanning data may be generated from the scanning data and reference data acquired before and after the scanning data was acquired without calculating black reference data. In this case, by using an equation combining an equation for calculating black reference data and an equation for shading correction based on the black reference data, black reference data does not need to be calculated in a separate operation.

Variation 6

When acquiring black reference data and white reference data as reference data in the embodiments described above, the controller 70 acquires the white reference data after acquiring black reference data, but may be configured to acquire the black reference data after acquiring white reference data. In either case, a time point in the accompanying claims may be understood to be a time point including the time when black reference data is acquired and the time when white reference data is acquired.

Variation 7

In the embodiments described above, the controller 70 acquires and stores reference data N, then calculates reference data for the scanning data acquisition period and generates an output image, sends the generated output image to the host device 100, and then resumes conveying and scanning the document S (the operation from S08 in FIG. 7, and the operation from S27 in FIG. 8). However, calculating black reference data, and generating and sending an output image to the host device 100 (S09-S11 in FIGS. 7, and S29-S31 in FIG. 8), and conveying and scanning the document S (S04, S05 in FIG. 7, S24, S25 in FIG. 8), may be executed as parallel processes.

Variation 8

In the first embodiment described above, the controller 70 acquires reference data at a constant time ΔT0 interval, but may be configured to acquire reference data each time a specific amount of scanning data is acquired. The controller 70 may also acquire reference data each time scanning a specific number of pixel lines in the Y-axis direction is completed. In other words, the interval for acquiring reference data is not limited to a time interval, and may be defined by an amount of data or a number of pixel lines.

Variation 9

The reference data acquisition interval may also be changed according a scanning setting. Examples of such scanning settings include the scanning resolution, color/monochrome mode, density setting, and contrast setting. The reference data acquisition interval may also be changed according to the type or size of document S. More particularly, by changing the reference data acquisition interval according to a scanning setting that affects the data size of the scanning data, the scanning data is preferably prevented from overflowing the scanning data storage 42. The reference data acquisition interval may also be changed according to the ambient temperature of the image reading device 1.

Variation 10

In the embodiments described above the controller 70 acquires the black reference data when the light source 31 is off, but may be configured to acquire black reference data when light emitted by the light source 31 is not incident on the image sensor 33, that is, when incidence of light on the image sensor 33 is blocked.

Variation 11

In the embodiments described above, the image processor 50 applies image processes such as shading correction, such as gamma correction, and line correction, but shading correction, such as gamma correction, and line correction may be applied by the host device 100. When shading correction is done on the host device 100 side, the host device 100 may acquire the scanning data and acquired reference data. In this case, the host device 100 may be considered part of the image reading device, and image processing may be applied as the data is acquired, or in a batch to all data.

Variation 12

In the embodiments described above, the image scanner 30 uses a color changing scanning method to read images with the image sensor 33 while changing the color of the light source 31, but other methods may be used, such as a color sensor method that reads images using a which light source with color filters disposed to the image sensor 33.

The shipped product may also be configured without a white reference panel. In this case, the value read with a temporarily installed white reference panel may be stored in the product before shipping, and when scanning after shipping, the stored value acquired with the temporarily installed white reference panel may be used for shading correction.

Variation 13

The foregoing embodiments describe an image reading device 1 having only a scanner function for outputting images to a host device 100, but the image reading device of the invention may also be applied to multifunction devices having, for example, one or more of a printer function for printing documents, a fax function for sending and receiving fax documents, an external memory function for outputting files to external storage, and a display for displaying images.

Other Embodiments

A method enabling the image reading device 1 according to the embodiments and variations described above to execute processes, a program enabling the image reading device 1 to execute processes, and a computer-readable storage medium recording such a program, are also included in the scope of the invention. Other variations not departing from the scope and spirit of the invention are also intended to be included within the scope of the following claims.

The entire disclosure of Japanese Patent Application No. 2018-079189, filed Apr. 17, 2018 is expressly incorporated by reference herein.

What is claimed is:

1. An output image generating method of an image reading device, comprising:
    a first acquisition step of storing, in a storage, first black reference data, which is black reference data acquired with a light source off at a first time point;
    a second acquisition step of storing, in a storage, second black reference data, which is black reference data acquired with the light source off at a second time point after the first time point;
    a first scanning step of storing, in a storage, without applying shading correction, scanning data captured from a document while the light source is on between the first time point and second time point; and
    a generating step of applying an image process, including shading correction using the first black reference data and second black reference data, to the scanning data after the second time point, and generating an output image.

2. The output image generating method of an image reading device described in claim 1, further comprising:
    a calculation step of calculating, after the second time point, black reference data for the scanning data acquisition period using the first black reference data and second black reference data; and
    in the generating step, applying to the scanning data shading correction using the black reference data.

3. The output image generating method of an image reading device described in claim 1, wherein:
    in the first scanning step, reading the document during conveyance;
    in the first acquisition step, acquiring the first black reference data when document conveyance is stopped and the light source is off; and in the second acquisition step, acquiring the second black reference data when document conveyance is stopped and the light source is off.

4. The output image generating method of an image reading device described in claim 1, further comprising:
   a third acquisition step of storing, in storage, third black reference data acquired when the light source is off at a third time point after the second time point; and
   a second scanning step of storing, in a storage, without applying shading correction, scanning data captured from a document being conveyed while the light source is on between the second time point and third time point; and
   in the generating step, applying after the third time point an image process, including shading correction using the second black reference data and third black reference data, to the scanning data captured between the second time point and third time point.

5. The output image generating method of an image reading device described in claim 4, wherein:
   an interval between the first time point and second time point is shorter than an interval between the second time point and third time point.

6. The output image generating method of an image reading device described in claim 1, further comprising:
   in the first acquisition step, storing, in a storage, first white reference data acquired with the light source on at the first time point;
   in the second acquisition step, storing, in a storage, second white reference data acquired with the light source on at the second time point; and
   in the generating step applying an image process including shading correction using the first black reference data, first white reference data, second black reference data, and second white reference data to the scanning data captured between the first time point and second time point.

7. An image reading device comprising:
   a first acquirer configured to store, in a storage, first black reference data, which is black reference data acquired with a light source off at a first time point;
   a second acquirer configured to store, in a storage, second black reference data, which is black reference data acquired with the light source off at a second time point after the first time point;
   a first scanner configured to store, in a storage, without applying shading correction, scanning data captured from a document while the light source is on between the first time point and second time point; and
   a generator configured to apply an image process, including shading correction using the first black reference data and second black reference data, to the scanning data after the second time point, and generate an output image.

* * * * *